Aug. 26, 1930.  E. G. GARTIN  1,774,483

AUTOMATIC LUBRICATOR

Filed March 29, 1928

Inventor
Elmer G. Gartin.
by
Atty.

Patented Aug. 26, 1930

1,774,483

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

AUTOMATIC LUBRICATOR

Application filed March 29, 1928. Serial No. 265,654.

My invention relates to automatic lubricators of the type particularly adapted for use in fluid pressure supply lines for rock drilling tools.

It is an object of my invention to provide an improved automatic lubricator of the type specified. A further object is to provide a simplified construction of such a lubricator which shall be operated in response to fluctuations in pressure in the pressure fluid supply line to supply lubricant in any position of the lubricator. A more specific object is to devise a lubricator having a lubricant reservoir pivotally mounted therein so that the same will automatically assume the proper position to supply lubricant into the pressure fluid line in any position of the lubricator. Other objects and advantages of my invention will hereinafter more fully appear.

In the accompanying drawings I have shown for purposes of illustration one form which my invention may assume in practice.

In these drawings,—

Figure 1:
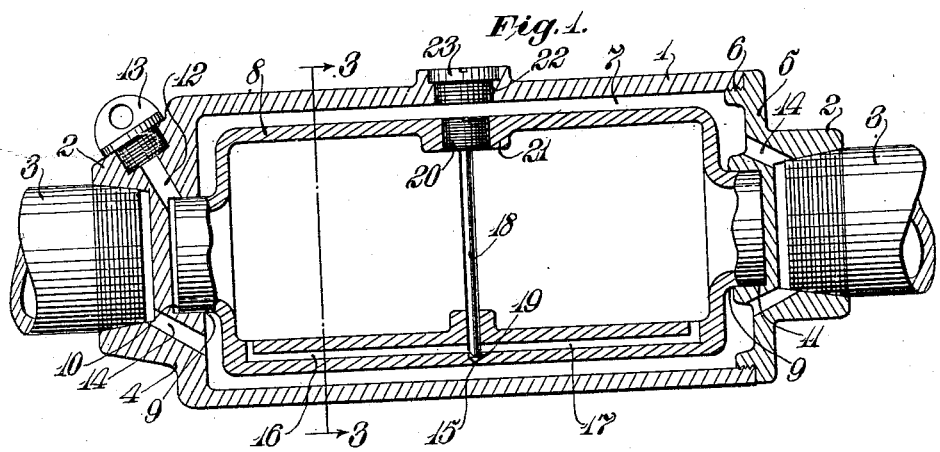
Fig. 1 is a central longitudinal section through my improved lubricator.
Figure 2:
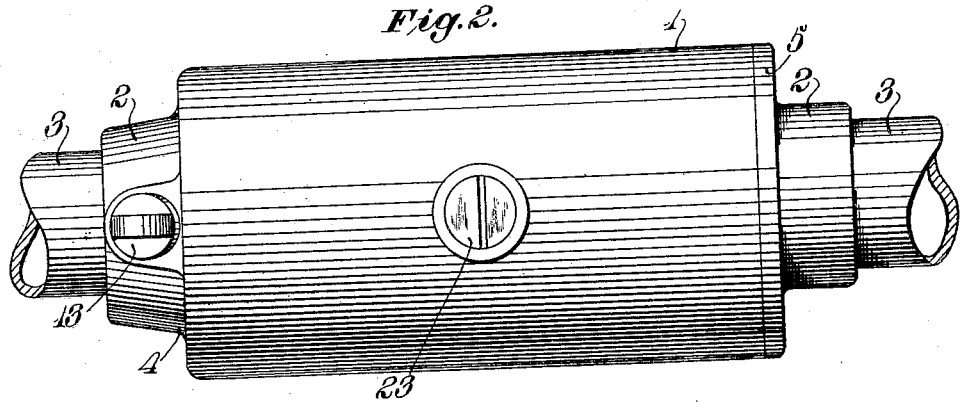
Fig. 2 is a plan view of the same.

In the illustrative embodiment my lubricator comprises a generally cylindrical casing 1 provided at opposite ends with internally threaded bosses 2 for connection to a pressure fluid line 3. The casing head 4 at one end of the casing is preferably made integral with the casing, while the opposite end is closed by a removable head member 5 which may be attached to the casing by screw threads 6. The casing 1 is hollow to provide a chamber 7 in which is pivotally mounted a lubricant reservoir 8, the walls of which are spaced from the walls of the casing 1 so as to provide unrestricted means for the passage of pressure fluid to the lubricator. This reservoir is mounted on trunnions 9, one of which has a bearing in a recess 10 in the casing head 4, while the other has a similar bearing in a recess 11 formed in the removable head 5. At least one of these trunnions is preferably hollow so as to provide suitable means for the introduction of lubricant through a filling passage 12 communicating with recess 10 and normally closed by a plug 13. Heads 4 and 5 are each provided with a plurality of angularly extending passages 14 in order to establish unrestricted communication between the lubricator casing and the pressure fluid line at opposite ends. The reservoir has formed therein a port 15 communicating with longitudinally extending passages 16 and 17 which in turn open into opposite ends of the lubricant reservoir for supplying lubricant from the reservoir into the pressure fluid passage between the outer casing and reservoir. In order to regulate the flow of lubricant I have provided a suitable valve 18 having a conical portion 19 adapted to cooperate with a conical seat formed at the end of port 15 and having formed at its upper end a threaded portion 20 which is mounted in an internally threaded boss 21 in the reservoir casing. This valve is easily accessible for purposes of adjustment through an alined opening 22 normally closed by a plug 23.

Figure 3:
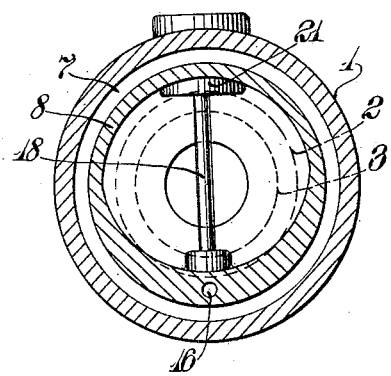
Fig. 3 is a vertical section on the line 3—3 of Fig. 1.

As best illustrated in Fig. 3, it will be seen that one side of the lubricant reservoir casing is made considerably heavier than the other side. This construction insures that the port 15 and passages 16 and 17 which are formed in the wall of the casing at approximately the center of the unbalanced mass, will always assume a position at the lowest point of the reservoir since the same is free to pivot about a longitudinal axis on trunnions 9.

The operation of my improved lubricator will be readily understood from the above description. When the reservoir is to be filled with lubricant, a suitable stop valve which is ordinarily provided in the pressure fluid supply line leading to the lubricator, will be closed before removal of the filling plug so that the lubricator will be relieved of all pressure. After filling the reservoir and insertion of the plug 13 the stop valve may be opened and the lubricator placed under pressure, whereupon the pressure fluid will flow through the port 15 past the valve 19 through passages 16 and 17 until the reservoir is subjected to line pressure. Now, if the operator of the tool to which pressure fluid is being supplied, opens the throttle valve of his machine there will be a flow of pressure fluid through the line 3 with a consequent reduction in pressure in the lubricator casing which will cause the pressure in the lubricant reservoir to force a quantity of lubricant back through passages 16 and 17 through port 15 into the annular space between the lubricant reservoir and the outer casing where it is picked up by the current of pressure fluid flowing to the tool. Also during operation, assuming that the tool to be lubricated is fitted with some form of reciprocating motor, there will be fluctuations in pressure in the supply line which will cause alternate flow of pressure fluid into the lubricant reservoir, giving the effect of an automatic pumping action. When the lubricator is rotated about a longitudinal axis away from the position illustrated in Fig. 1, it will be evident that the unbalanced mass of the lubricant reservoir will cause the same to pivot on the trunnions 9 until a position of equilibrium is reached.

As a result of my invention it will therefore be seen that a very simple and compact construction has been devised which will allow the lubricator to function after a well-known principle to supply the proper amount of lubricant into a pressure fluid supply line and that the lubricator does not have to be placed in one certain position, but on the contrary may function efficiently in any position which it is liable to assume in use.

This construction also permits the feeding of substantially all the lubricant from the reservoir no matter in what position the lubricator may be placed in service.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an automatic lubricator adapted to be installed in a pressure fluid supply line, a support, means provided thereby for connection to a pressure fluid supply line, a lubricant supply reservoir pivotally carried by said support, said reservoir having a filler opening communicating therewith and means for closing said opening, and means for establishing communication between said reservoir and said pressure fluid supply line to permit supply of lubricant to said line.

2. In an automatic lubricator adapted to be installed in a pressure fluid supply line, a support, means provided thereby for connection to a pressure fluid supply line for conducting pressure fluid therethrough, a lubricant supply reservoir pivotally mounted in said support, said reservoir having a filler opening communicating therewith and means for closing said opening, an opening in said reservoir communicating with said pressure fluid supply line, and a valve for controlling said opening.

3. In an automatic lubricator adapted to be installed in a pressure fluid supply line, means provided by said lubricator for conducting pressure fluid therethrough, a lubricant supply reservoir pivotally mounted on said means arranged to swing about an axis spaced from its center of gravity and containing a substantial quantity of lubricant, and means for establishing communication between said pressure fluid conducting means and said reservoir at a point adjacent the bottom of said reservoir.

4. An automatic lubricator adapted to be installed in a pressure fluid supply line comprising a casing, means provided by said casing for connection into a pressure fluid supply line, a lubricant supply reservoir pivotally mounted in said casing and capable of holding a substantial quantity of lubricant, and means for establishing communication between said reservoir and the interior of said casing whereby lubricant is supplied as needed from said reservoir to said pressure fluid supply line.

5. An automatic lubricator adapted to be installed in a pressure fluid supply line comprising a substantially cylindrical hollow casing, means carried by the ends of said casing for connection into a pressure fluid supply line to allow flow of pressure fluid through the interior of said casing, a lubricant supply reservoir pivotally mounted in said casing about an axis substantially parallel with the longitudinal axis of said casing, said reservoir having its center of gravity spaced from its pivotal axis and being provided with an opening on the same side of its pivotal axis as the center of gravity whereby a constant communication is maintained between the interior of said casing and the lowest point in said reservoir to supply lubricant to said pressure fluid line.

6. An automatic lubricator adapted to be installed in a pressure fluid supply line comprising a casing having means for connection into the pressure fluid supply line, said casing having bearings fixed on the interior thereof, a lubricant supply reservoir pivotally mounted in said bearings, a filler opening for said reservoir associated with one of said bearings, means for conducting pressure fluid through the interior of said casing around the walls of said reservoir, and means for establishing communication between said reservoir and said casing whereby a lubricant is supplied to said pressure fluid line.

7. An automatic lubricator adapted to be installed in a pressure fluid supply line, an elongated casing having means for connection into said line, a lubricant supply reservoir containing a substantial quantity of lubricant pivotally mounted in said casing and constructed so as to have an unbalanced weight on one side of its pivotal axis, means for conducting pressure fluid through the interior of said casing around the walls of said reservoir, said weighted portion having an opening for establishing communication between said reservoir and the interior of said casing whereby lubricant is supplied to said pressure fluid line, and a valve for controlling said opening.

8. An automatic lubricator adapted to be installed in a pressure fluid supply line, an elongated hollow casing having means for connection into a pressure fluid supply line, a lubricant supply reservoir capable of holding a substantial quantity of lubricant pivotally mounted in said casing and constructed so as to have an unbalanced weight on one side of its pivotal axis, and means for conducting pressure fluid through the interior of said casing around the walls of said reservoir, said weighted portion having an opening therein for establishing communication between said reservoir and the interior of said casing whereby lubricant is supplied to said pressure fluid supply line and a valve for controlling said opening, said casing having an opening to provide access to said valve, and a plug normally closing said latter opening.

9. An automatic lubricator adapted to be installed in a pressure fluid supply line, an elongated hollow casing having means for connection into said line, a lubricant supply reservoir capable of holding a substantial quantity of lubricant pivotally mounted in said casing and constructed so as to have an unbalanced weight on one side of its pivotal axis, means for conducting pressure fluid through the interior of said casing around the walls of said reservoir, said weighted portion having an opening for establishing communication between said reservoir and the interior of said casing whereby lubricant is supplied to said pressure fluid line and a valve for controlling said opening, the wall of said casing having a plurality of branched passages therein extending to opposite ends of said reservoir and communicating with said opening.

In testimony whereof I affix my signature.

ELMER G. GARTIN.